United States Patent [19]

Dubots

[11] Patent Number: 5,217,930

[45] Date of Patent: Jun. 8, 1993

[54] BINODAL METALLIC CARBIDE AND ITS USE AS A CATALYST

[75] Inventor: Dominique Dubots, Le Fayet, France

[73] Assignee: Pechiney Electrometallurgie, Courbevoie, France

[21] Appl. No.: 647,133

[22] Filed: Jan. 29, 1991

[30] Foreign Application Priority Data

Jan. 29, 1990 [FR] France ................. 90 01577

[51] Int. Cl.⁵ .............................................. C04B 35/56
[52] U.S. Cl. ......................................... 501/88; 501/80; 502/178
[58] Field of Search ............... 501/88, 81, 80; 502/178

[56] References Cited

U.S. PATENT DOCUMENTS

| | | | |
|---|---|---|---|
| 3,345,440 | 10/1967 | Googin et al. | 264/29.1 |
| 3,859,421 | 1/1975 | Hucke | 423/445 |
| 4,067,956 | 1/1978 | Franklin et al. | 423/445 |
| 4,536,358 | 8/1985 | Welsh et al. | 264/81 |
| 4,818,732 | 4/1989 | Fox et al. | 501/81 |
| 4,914,070 | 4/1990 | Ledaix et al. | 502/178 |
| 4,940,684 | 7/1990 | Okutani et al. | 502/178 |
| 5,008,054 | 4/1991 | Kato et al. | 501/81 X |

FOREIGN PATENT DOCUMENTS 1484116 6/1967 France .

OTHER PUBLICATIONS

Webster's "New Riverside University Dictionary" (1984) p. 761.

*Primary Examiner*—Mark L. Bell
*Assistant Examiner*—Chris Gallo
*Attorney, Agent, or Firm*—Dennison, Meserole, Pollack & Scheiner

[57] ABSTRACT

A porous refractory carbide with a large specific surface area is disclosed. The refractory carbide has a skeleton of metallic or metalloid refractory carbide and has a bimodal open porosity with a group of pores of 1 to 100 microns and a group of pores smaller than 0.1 micron.

6 Claims, 1 Drawing Sheet

BINODAL METALLIC CARBIDE AND ITS USE AS A CATALYST

TECHNICAL FIELD

The invention concerns a method of obtaining porous solids, chiefly comprising refractory carbides of metallic and/or metalloid substances such as SiC. The starting material used is in particular organic compounds which can be cross-linked and coked, and metallic and/or metalloid powders which can be carburised. It also concerns new products in the form of porous substances, chiefly comprising refractory carbides of metals or metalloids.

STATE OF THE ART

Owing to its refractory properties and great chemical inertia silicon carbide, like most other metallic or metalloid carbides, may for example advantageously be used in the form of porous solids (mouldings, granules, extrusions or the like) in many applications, particularly as a catalyst carrier or even a catalyst in high temperature chemical reactions, e.g. in the chemical, petroleum or exhaust silencer industry, but also as filtering components for aggressive gases or liquids, molten metals or the like, or even as a heat recuperator and exchanger.

In these applications the porous solids may have a monolithic structure, sometimes of a large size, or a granular structure and must have both good mechanical resistance or good resistance to wear and excellent heat stability, in order to maintain the specific properties of the carbide and structure with the passage of time and after many heating cycles.

A number of documents describe methods of preparing porous bodies of silicon carbide:

U.S. Pat. No. 3,345,440 (U.S. Atomic Energy Commission) describes a method which comprises mixing a partially polymerised bonding agent based on furfuryl alcohol with constituents producing urethane and silicon powder or powder of other metals. The liberation of $CO_2$ which results from combining the constituents producing the urethane leads to the formation of a foam. When this has consolidated it is calcined at high temperature (2200° C.) to give a foam containing SiC. But the large amount of gas liberated gives macroporosity which—as will be explained later—is prejudicial to the main object of this application, the obtaining of catalysts.

U.S. Pat. No. 4,536,358 (WELSH) obtains a porous product of metallic carbide or metalloids with an appropriate surface and porous structure, by using a carrier of inorganic oxide (alumina for example) which has the properties of surface and porous structure. A polymerisable organic product is deposited on the inorganic carrier and is pyrolysed to form a layer of carbon compound. The metal or metalloid of which the carbide is to be obtained is finally deposited on that layer, by techniques of depositing in vapour phase. It is heated at a high temperature and a carbide replica of the surface of the oxide is thus obtained; the oxide may be removed, for example by dissolving it.

U.S. Pat. No. 3,859,421 (HUCKE) enables a porous carbon structure to be obtained, with a volume and a pore distribution which are controlled independently. For this purpose a binder, which will give the residual carbon skeleton after calcination, is mixed with an expanding liquid forming a continuous liquid phase which, when removed, will give the network of interconnected pores, and with a dispersing agent to ensure the continuity of the expanding liquid phase. The mixture is moulded, then consolidated, for example, by polymerising the bonding agent; the foaming liquid is removed, giving rise to the network of pores, and the remaining bonding agent is calcined. If silicon or silica is added to the mixture, SiC can be obtained after pyrolysis at a very high temperature.

U.S. Pat. No. 4,067,956 (FRANKLIN) describes a porous carbide structure which is derived from a polyurethane structure by infiltrating a thermosetting resin inside that structure and carbonising the product obtained at high temperature. Products containing carbides may be obtained by infiltrating the pores with a carburisable metal or by covering the pores with carbide or nitride coatings through chemical deposition in vapour phase.

U.S. Pat. No. 4,818,732 describes a method of producing a silicon carbide ceramic which has a large specific surface area with open microporosity, comprising calcining a polyorganosilane gel in an inert atmosphere. The total amount of silica and carbon, the pore size and the pore distribution may be modified by subsequent treatments allowing for selective elimination of the carbon and/or silica.

OBJECT OF THE INVENTION

One object of the invention is to obtain porous solids of geometrical shape adapted to requirements (mouldings, granules, extrusions or the like) essentially made up of refractory carbides of metallic or metalloid substances with a large specific surface area, the solids having:

adequate mechanical properties which give them good resistance to crushing, through having a solid enough skeleton of carbides of said metallic and/or metalloid substances, made up of sintered microcrystals good resistance to erosion and abrasion, due in particular to a good degree of sintering good heat stability so as to avoid any change of structure which might lead to a reduction of the specific surface area.

Another object is to obtain pieces which have the desired porosity adapted to the envisaged use as catalyst carriers.

The porosity of a catalyst is generally classed in three types according to the mean diameter. A distinction is made between:

macropores (macroporosity) with a diameter of over 100 microns, which are ineffective from the catalytic point of view and have the disadvantage of taking the place of the active material;

mesopores (mesoporosity) with a diamager of from 1 to 100 microns, which enable gases or liquids to be transferred within the catalytic material;

nanopores (nanoporosity) with a diameter generally from 0.005 micron to 0.1 micron, which develop a large surface area on which the catalyst is deposited.

The pieces according to the invention have essentially bimodal porosity, comprising mesopores and nanopores with a small proportion of macropores.

"Modal" will be understood to be defined as: of, ore relating to, a statistical mode, e.g., most common; or typical. In other words, the value that occurs most frequently. The distribution of pores in the metallic carbide of the invention is essentially bimodal, i.e., statistically the pores are essentially grouped as two "families" of pores of two different sizes.

DESCRIPTION OF INVENTION

Figure 1:
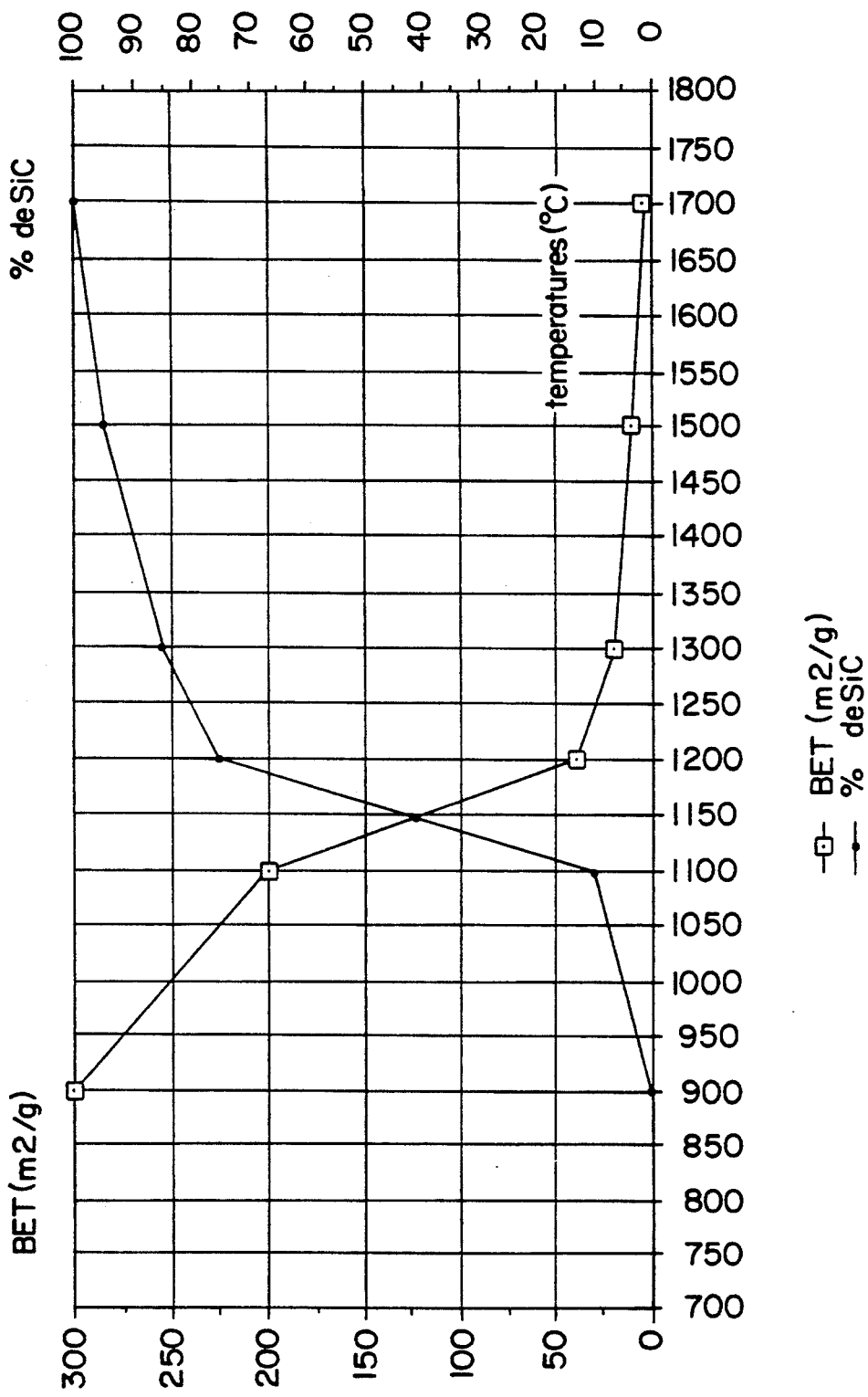
FIG. 1 is a graphic representation of the influence of the carburizing temperature on the quantity of SiC formed and the BET specific surface area of the refractory carbide produced as set forth in Example 10.

The invention is a method of obtaining catalyst carriers and self-supported catalysts of a form and a bimodal porosity adapted to requirements, chiefly comprising refractory carbides of metallic and/or metalloid substances with a large specific surface area, characterised in that:

- at least one exclusively organic, polymeric and/or polymerisable compound, which can be cross-linked, can be carbonised with a large carbon yield and which can give a solid carbon skeleton, is intimately mixed with a powder of metal (or metalloid) and/or of a metallic (or metalloid) compound which can be reduced by carbon, the powder being non-fusible under the conditions of treatment and the metal (or metalloid) being carburisable, and with possible solvents, plasticisers and/or other organic or non-organic additives, so as to obtain a pasty mixture
- the mixture is shaped
- at least part of any solvents, plasticisers and/or additives is removed
- the organic compound is cross-linked, possibly after having been polymerised
- heat treatment is applied at a first stage, at from 500 to 1000° C., to carbonise the organic compound and obtain a porous skeleton essentially comprising a mixture of carbon and particles of said metal (metalloid) and/or said metallic (metalloid) compound, and at a second stage—after possible reduction of the metallic or metalloid compound—to obtain conversion to carbide at a moderate temperature in a non-oxidising atmosphere, the heat profiles being such that the reactions take place in solid and/or gas phase.

The exclusively organic compound refers to polymers in which the main chain is essentially formed by a carbon skeleton, except for chains in which the skeleton is formed not of carbon groups but essentially of other atoms such as silicon (organo silane), boron or phosphorus.

According to the invention the organic compounds are generally used in a liquid or preferably pasty state, so that mixing with the non-fusible powder can be carried out under favourable conditions. These liquid or pasty states may be natural at room temperature or obtained by melting at a temperature below their cross-linking and/or carbonising temperature and preferably at a temperature only slightly above room temperature, or alternatively by means of a solvent and/or plasticiser which can also be removed at a temperature below the cross-linking and/or carbonising temperature. They are generally polymeric, thermoplastic and can be cross-linked by any means known in macromolecular chemistry, for example by heat, thermal decomposition of an initiator (such as a peroxide), by reaction with a hardener either with or without a catalyst added to it, by irradiation, addition of a monomer or the like, so that the product obtained after mixing with the non-fusible powder and hardening has a specific geometrical shape.

The organic compounds used may alternatively be one or more organic monomers which are then polymerised and cross-linked by the methods of macromolecular chemistry as indicated above.

It is important that after carbonization the organic compounds should give a solid carbon skeleton, preferably one which can be activated by normal methods of preparing active carbons known in the art, with a carbonisation rate (ratio of carbon residue) of at least 25%. Resins such as furfuryl, phenolic resins and the like are suitable, for example; complex organic compounds such as pitches are also suitable.

In the following, and by convention, the term "metal" will also include metalloids as just described. The term "non-fusible" signifies that the powder is not fusible during the process according to the invention, and particularly during the various heat treatments carried out.

The non-fusible powder may, for example, be a metal, preferably silicon, which may be used as such or partially oxidised. But other metals and/or metallic compounds or mixtures thereof with one another or with silicon may equally be used, provided the metal or compound is not fusible under the conditions for obtaining the carbide, that the compound can be reduced by carbon and that the metal can be carburised to give refractory carbides. The appropriate metals are generally transition elements from groups 3b, 4b, 5b, 6b, 7b, 8 of series or periods 4, 5, 6 of the Periodic Table of Elements, rare earths (lanthanides) or actinides; but Mo, W, Re and also V, Ta, Nb, Ti, Cr, Ni, Co and the like are particularly preferred. The said compound is usually an oxide. The dimension of its particles is usually smaller than 100 microns and its BET specific surface area at least 0.5 $m^2/g$.

The presence of oxidised substances is not ruled out. When reduction takes place, however, the proportion of oxide added should preferably not consume a quantity of carbon such that the strength of the carbon skeleton is threatened.

It is important for the powder to be as fine as possible. This improves the final yield of the carburising treatment and enables the initial powder to be fully converted.

Other additives, adapted e.g. to the use envisaged for the porous solid, may also be included. Some of them serve to change the properties of the solid, e.g. its specific surface area, porosity, surface activity, mechanical properties or the like. Thus some examples are:

- hardening agents such as initiators and catalysts for cross-linking and copolymerisation
- expanding agents designed to give better control of the formation of mesoporosity, e.g. melamine, organic fibres, nanometric silicas, inorganic salts or organic products which are inert relative to the other constituents of the mixture and which decompose in the form of gases during the process. Expanding agents which develop macroporosity and foaming agents such as urethanes and polyurethanes should not be used.
- agents for generating a specific surface (nanoporosity) such as carbon black, active carbon fines, monocrystalline celluloses and the like
- activating agents or catalysts for activating the porous surfaces obtained, such as alkali metal salts (sels alcalins), phosphates, aluminium salts and the like doping agents to change the surface properties of the pores generated, such as multivalent metal compounds, which are recovered after the heat treatment, e.g. in the form of carbides or intermediate oxycarbides and so on.

The quantity of resin and any organic additives used is generally such that the quantity of carbon generated after carbonisation is at least slightly in excess of the stoichiometric quantity in the reactions involved in the various heat treatment, particularly reducing and carburising reactions.

After final carburisation the excess carbon can be removed by controlled oxidation at low temperature in air, or more commonly in the presence of oxygen, at a temperature usually from 500 to 900° C. preferably about 600° C. It must not be high, otherwise the product will run the risk of being damaged during oxidation. Shaping is carried out by any known means such as casting, extrusion, pressure molding compression or the like.

As mentioned above, hardening may be accompanied or preceded by removal of the solvent or more generally of organic compounds of low molecular weight. These polymerising, cross-linking and solvent removing operations must take place at a temperature below the carbonising temperature.

Carbonisation of the intial organic product, that is to say, controlled pyrolysis in a non-oxidising atmosphere, is effected with a temperature profile adapted to the organic constituents used and the mass and density of the pieces treated; as already mentioned, the carbonisation temperature is from 500° to 1000° C.

When the product has been fully carbonised a porous carbon skeleton is obtained, in which the particles of the initial powders are embedded and dispersed. For the application in question, which is the preparation of catalyst carriers or catalysts, it is preferable to change the porosimetric distribution of the carbon skeleton through activating the carbon phase of the skeleton by any normal known means used to obtain active carbons; this essentially comprises controlled oxidation of the carbon in the skeleton, by injecting a slightly oxidising gas e.g. $CO_2$ and/or $H_2O$, at from 500° to 1000° C. This will considerably enlarge the specific surface areas of the solid by creating nanoporosity.

Carburisation is then carried out in a static, non-oxidising atmosphere or with an inert or reducing "sweep" gas, e.g. with argon, hydrogen, hydrocarbon, nitrogen, ammonia or the like, at a moderate temperature, i.e. generally from 1000° to 1400° C. and preferably from 1150° to 1250° C., in order to avoid enlargement of grains, causing loss of surface. It is also important to keep the temperature below the melting point of the metal or metallic compound, so as to avoid the risk of the pores being blocked. During this operation the oxides are reduced, or oxide reduction is terminated if it was started at the previous stage, and carburisation is carried out long enough for the metal bedded in the carbon skeleton to be converted. Conversion is generally total but may be partial according to the metals used; the important factor is that the metal should be at least 80% carburised. The product obtained is then a porous solid (moulding, granule, extrusion or the like) chiefly comprising a skeleton of sintered micro crystals of carbide of the metal or metals contained in the initial mixture; these may form defined compounds or various solid solutions. The product may contain residual carbon, which is removed during oxidation as mentioned above.

When the carburising heat treatment has not been total, residual particles of unreacted metals or metalloids may be found in the final product, coated in phases which have reacted. These residual particles are not generally troublesome, since they are not on the surface of the carbide skeleton.

Oxidised metastable phases may equally be found at the surface in the state of a quasi-molecular layer; they may be made up of oxycarbides, oxycarbonitride and-/or sub oxides or the like which often appear to be amorphous after examination by X-ray diffraction, and also oxygen atoms which have been adsorbed on or trapped in the crystal lattice.

The porous skeleton of carburised products has excellent mechanical properties, particularly resistance to crushing and a large BET specific surface area, always over 15 m$^2$/g or even 30 m$^2$/g, when the residual carbon has been removed.

In cases where the product is to be a high temperature catalyst carrier based on SiC, the largest and most active specific surface areas are also obtained by adjusting operating conditions, e.g. by carburising at a moderate temperature (1150°-1200° C.), so as to avoid excessive recrystallisation.

On analysis, the presence of an amorphous material which might be an oxycarbide written as $SiO_xC_y$ is then detected on the surface of the SiC. Similar, relatively unstable materials of the oxycarbide type are also observed in the case of metallic carbides according to the invention and particularly carbides of multivalent metals. These generally amorphous, metastable materials encourage activation of the porous surface of the carbide carrier and subsequent deposition of catalyst; they may also modify the activity of the catalyst.

In this case it will also be noted that bimodal distribution of porosity is favourable:

mesoporosity with a family of pores generally from about 1 to 100 microns, providing for access, circulation and mass transfers of gases or liquids nanoporosity with a family of pores generally smaller than about 0.1 micron, essentially intended for catalysis and increasing the specific surface area.

This bimodal porosity makes it possible to have an active surface which participates in catalytic processes, encouraging good dispersion of catalysts and good reactivity in fixing the catalysts owing to the amorphous substances at the surface, and improving the catalytic action (yield, selectivity) of the catalysts deposited.

In cases where the carbide itself has catalytic properties, the porous substances obtained may be used as catalysts for high temperature chemical or petrochemical reactions, reactions converting exhaust fumes from motor vehicles etc., either directly or after special activating treatments appropriate to each of them and/or to the catalytic reaction envisaged. The carbides may equally be used with any catalyst carriers.

The catalytic activity of the skeleton may equally be modified by inserting doping substances in its crystal lattice, the doping substances being adapted to modify the energy level of the surface to encourage the appearance and stabilisation of amorphous or metastable substances, and adapted to create active locations by being present at the surface.

Catalytic activity may also be improved by adding alkali metal or alkaline earth metal compounds.

A catalyst carrier may be characterised not only by the value pf its specific surface area but also by its quality, particularly its "acidity" in the Lewis and/or Bronsted sense, that is to say, its ability to accept or yield electrons. In the case of the carbides according to the invention, it has been found that the carrier could be activated by acid or basic treatments and that this type of activating treatment could lead to a change in surface acidity and/or in the value of the specific surface area. In particular, "acid" surface states are required for carriers in many applications. The acid or basic treatments may be carried out in liquid or gas phase, pure or dilute (solution or the like). According to the type of activation required one may use, for example, soda, ammonia, hydrochloric acid, nitric acid or the like and particularly anhydrous hydrofluoric acid (liquid or gas), in pure or dilute form (diluted with $N_2$, $H_2O$ or the like) in the case of silicon carbide.

EXAMPLES

Example 1

This test is an example of how to obtain an activated catalyst carried based on silicon carbide.

The initial mixture contains:
500 g of furfuryl resin (Quaker Oats Chemicals LP340)
300 g of organic hardener (C52, organic solution of paratoluene sulphonic acid in ethyl glycol and butyl glycol) adapted to the resin
40 g of Si powder with a BET specific surface area of 8 $m^2/g$ and a particle size of under 60 microns.

It is moulded into a cylindrical lump 10 cm in diameter and 5 cm high. Hardening is effected in an oven at 100° C. for 2 hours. The solid cylinder obtained is crushed and screened to give a granulometric fraction between 4 and 8 millimeters. The granules thus obtained are carbonised at 900° C. with nitrogen scavenging for 2 hours, to give a carbon skeleton encrusted with particles of Si. This is activated by treatment at 900° C. for 4 hours in a $CO_2$ atmosphere.

The carburising heat treatment takes place at 1200° C. for 2 hours with Ar as a sweep gas, and the residual carbon is then removed by heating to 600° C. in air.

This gives a skeleton consisting chiefly of SiC with a BET specific surface area of 168 $m^2/g$ before the residual carbon is removed. When it has been removed the specific surface area is 30 $m^2/g$. The pore spectrum has a bimodal distribution centred on pore diameters of 11 and 0.1 micron, and the material is found to have excellent resistance to crushing.

Example 2

Using the same mixture, the same process is carried out but without crushing the cylinder; and after the carbonisation the carburising treatment takes place at 1400° C. for 2 hours.

The carbide skeleton obtained has only a BET specific surface area of 2 $m^2/g$, both before and after the residual carbon has been removed; the majority of macropores are from 50 to 1 micron and the cylinder also has excellent resistance to crushing. A product of this type is unsuitable for catalysis.

Example 3

This example illustrates the effects obtained by including additives in the starting mixture.

The mixture comprises:
500 g of furfuryl resin LP 340
40 g of organic hardener C52
300 g of the same Si powder
100 g of carbon black (FW2V-Degussa)
330 g of a solution of 80 g of Al stearate in 250 g of ethanol The function of the additives can be described as follows:
the Al stearate dissolved in ethanol provides aluminium which, in this form, is distributed very homogeneously in the mixture; the aluminium is designed to inhibit crystal growth and thus increase the specific surface area in terms of fine pores; it also changes the surface condition of the SiC carrier to increase the activity of the catalysts which will be deposited thereon, the carbon black changes the rheological properties of the mixture by increasing its viscosity, activates the carbon carrier (and is eliminated in that operation), and thus increases the porosity of the SiC carrier in terms of small pores.

The mixture is extruded in the form of small sticks. They are heated at 110° C. for 16 hours in an oven. Carbonisation and activation take place under the same conditions as in Examples 1 and 2. The carburising heat treatment is effected at 1200° C. for 2 hours in Ar. The SiC skeleton has a BET specific surface area of 122 $m^2/g$. When the residual carbon has been removed by heating to 600° C. for 3 hours in air, the BET specific surface area reaches 48 $m^2/g$.

Example 4

This example illustrates the effects obtained with other additives. The starting mixture is as follows:
1000 g of furfuryl resin LP 340
70 g of organic hardener C52
700 g of the same Si powder
65 g of Al phosphate
100 g of pyrogenic silica (FK320 Degussa), very finely divided silica with a large BET specific surface area (320 $m^2/g$).
600 g of water Here the function of the additives is as follows:
the aluminum phosphate to provide aluminum combined with an anion which will encourage activation of the carbon carrier;
the pyrogenic silica to facilitate the carburising reaction
the water to distribute the Al phosphate, reduce viscosity and to be an expanding agent conductive to mesoporosity.

After shaping as in Example 3 curing is carried out at 120° C. for 16 hours.

Carbonisation and activation take place under the same conditions as previously. The carburising heat treatment is applied at 1200° C. for 2 hours in Ar. The BET specific surface are obtained is 190 $m^2/g$. When the residual carbon has been removed (600° C. for 3 hours in air) the specific surface area obtained is 31 $m^2/g$.

Example 5

In this example the viscosity of the initial mixture is increased by adding carbon black with a view to shaping it by extrusion.

The initial mixture contains:
500 g of furfuryl resin (LP 340)

40 g of organic hardener C52
300 g of the same Si powder
100 g of carbon black (BET specific surface area 250 m$^2$g).

The viscosity of the mixture is such that it is extruded through a die to obtain small sticks about 3 to 4 mm in diameter and 4 to 6 mm long. Hardening, carbonisation, activation and carburising are carried out as before. After carburisation the BET specific surface area obtained is 122 m$^2$/g. After oxidation treatment (600° C. in air for 3 hours) to remove the residual carbon, the BET specific surface area of the sticks of silicon carbide is 48 m$^2$/g.

Example 6

In this example a different, exclusively organic compound is used.
The initial mixture contains:
500 g of liquid phenolic resin, viscosity 4 Pa.s (4000 centipoise)
40 g of hardener based on hexamethylene tetramine
250 g of the same Si powder.

As in Example 5, the mixture is extruded into the form of small sticks, then hardened, carbonized, activated and carburised. The carbide obtained before the residual carbon is removed has a BET specific surface area of 190 m$^2$/g.

Example 7

This example illustrates how to obtain a combined silicon and molybdenum carbide.
The initial mixture contains:
140 g of furfuryl resin (LP340)
5 g of organic hardener C52
100 g of the same Si powder
50 g of molybdenum powder with a particle size of under 150 microns The mixture is shaped and treated as in Example 1: hardening, crushing, carbonisation, activation, carburisation. The porous, combined carbide of SiC, Mo$_2$C obtained has a BET specific surface area of 83 m$^2$/g before the residual carbon is removed and an area of 21 m$^2$/g after its removal (at 600° C. in air for 3 hours).

Example 8

This example illustrates how to obtain a combined carbide with a large specific surface area from a metallic compound which can be reduced by carbon.
The initial mixture contains:
300 g of furfuryl resin (LP 340)
5 g of organic hardener C52
140 g of the same Si powder
100 g of molybdenum oxide (MoO$_3$) of over 100 microns.

It is shaped and treated as in Example 1: hardening, crushing, carbonisation, activation, reduction, carburisation. A combined carbide of SiC and MO$_2$C is obtained, with a BET specific surface area of 51 m$^2$/g before the residual carbon is removed.

Example 9

The initial mixture comprises:
690 g of furfuryl resin (LP 340)
300 g of Si powder (specific surface area 11 m$^2$/g and under 60 microns)
10 g of cross-linking catalyst (C52)

The mixture is hardened at 150° C. and the mass obtained is crushed into grains about 4 to 8 mm, which are carbonised at 900° C. in nitrogen. The carbon skeleton is activated by treatment at 900° C. in CO$_2$; then carburisation is effected at 1200° C. for 4 hours, also in Ar. The carbide obtained has a BET specific surface area of 96 m$^2$/g and an oxygen content of 7%. When the residual carbon has been removed (600° C., 3 hours in air) the carbide is treated with a 40% aqueous solution of hydrofluoric acid, then rinsed and dried. The BET specific surface area obtained is 190 m$^2$/g and the oxygen content 3%; in addition, measurement of surface acidity shows there to be an acid reaction.

Example 10

This example illustrates the influence of the conversion temperature on the degree to which the carbonised mixture is converted to SiC.
The initial mixture contains:
980 g of furfuryl resin LP 340 produced by Quaker Oats Chemicals
820 g of ground silicon with a specific surface area of 8 m$^2$/g
200 g of Printex carbon black produced by Degussa The mixture is extruded, polymerised in an oven then carbonised at 800° C. in nitrogen. At the end of the carbonisation stage the batch is divided into 6 samples which are treated for conversion to SiC, each for 2 hours in argon but at different temperatures: 900° C., 1100° C., 1200° C., 1300° C., 1500° C., 1700° C.

Each of the 6 batches then undergoes oxidation at 600° C. for 8 hours in air to eliminate the excess carbon. The BET surface area of each of the 6 batches is measured, and the quantity of SiC formed is calculated by comparing oxidation rates on the carbonised product (before conversion to SiC) and on the treated product (after conversion).

FIG. 1 gives the results obtained. It will be seen that when the treatment temperature rises the rate of conversion to SiC increases, whereas the BET specific surface area is reduced. It emerges very clearly that the range of temperatures within which these values vary most is a narrow one: from 1000° to 1400° C. So the compromise between rate of conversion to SiC and specific surface area can be obtained most easily within that range. The temperature range which appears to give the best compromise for SiC carriers is in fact from 1150° to 1350° C.

Example 11

This example illustrates the preparation of a porous body of tungsten carbide from metallic tungsten. The following are blended in a mill with Z shaped mixing arms:

84% by weight of tungsten powder smaller than 200 micron 13% by weight of furfuryl resin LP 340 from QO Chemicals 3% by weight of Printex 85 carbon black from Degussa.

The homogeneous paste is extruded through a die with a screw type extruder to obtain small sticks. The extrusions are brought to 120° C. in a ventilated oven to ensure that they harden by thermosetting of the resin contained in them. The solid extruded sticks are carbonised continuously at 700° to 900° C. in a rotating oven with nitrogen as a sweep gas. Their BET specific surface area is then 40 m$^2$/g. The carbonised sticks are then converted continuously in a rotating oven at 1220° C. with argon sweeping. The products obtained have a specific surface area of 28 m$^2$/g, and identification of the phases by X-ray diffractometry indicates the presence of tungsten carbide WC and non-converted metallic tungsten.

Example 12

This example illustrates the preparation of a porous body of tungsten carbide from tungsten oxide $WO_3$.

The tungsten oxide is previously placed in a ball mill with metal balls together with 7% by weight of Printex 85 carbon black from Degussa. This operation reduces the particle size of the oxide. The process is encouraged by the action of the carbon black in preventing the formation of clots; the carbon black is mixed intimately with the oxide. The mixture resulting from the grinding has a specific surface area of approximately 10 $m^2/g$. It is homogenised with 25% by weight of furfuryl resin LP 340 from QO Chemicals in a mill with Z shaped mixing arms. The homogeneous paste is extruded through a die with a screw type extruder to obtain small sticks. The extrusions are brought to 120° C. in a ventilated oven, so as to ensure that they harden through thermosetting of the resin contained in them. The solid extruded sticks are carbonised continuously at from 700 to 900° C. in a rotating oven with nitrogen, as a sweep gas. Their BET specific surface area is then 103 $m^2/g$. The carbonised sticks obtained are then converted continuously in a rotating oven at 1220° C. with argon sweeping.

The products obtained have a specific surface area of 42 $m^2/g$, and identification of the phases by X-ray diffractometry indicates the presence of:
a majority phase of tungsten carbide WC
a secondary phase of tungsten carbide W2C
a small minority phase of metallic tungsten Example 13

This example illustrates the preparation of a porous body of vanadium carbide from the oxide $V_2O_5$.

The vanadium oxide is previously placed in a ball mill with metal balls, together with 17% by weight of Printex 85 carbon black from Degussa. This operation enables the particle size of the oxide to be reduced. The process is encouraged by the action of the carbon black in preventing the formation of clots; the carbon black is intimately mixed with the oxide. The mixture resulting from the grinding has a specific surface area of approximately 10 $m^2/g$.

The mixture is homogenised with 40% by weight of furfuryl resin LP 340 from Qo chemicals in a mill with Z shaped mixing arms. The homogeneous paste is extruded through a die by means of a screw type extruder and small sticks are obtained. The extrusions are brought to 120° C. in a ventilated oven, so as to ensure that they are hardened through thermosetting of the resin contained in them. The solid extruded sticks are carbonised continuously at from 700° to 900° C. in a rotating oven with nitrogen, as a sweep gas. Their BET specific surface area is 162 $m^2/g$. The carbonised sticks are then converted continuously in a rotating oven at 1220° C. with argon sweeping.

The products obtained have a specific surface area of 71 $m^2/g$, and identification of phases by X-ray diffractometry indicates the presence of:
a majority phase of vanadium carbides V8C7 and V4C3

Example 14

This example illustrates the preparation of a porous body of molybdenum carbide from the oxide $MoO_3$.

The molybdenum oxide is previously placed in a ball mill with metal balls, together with 14% by weight of Printex 85 carbon black from Degussa. The operation enables the particle size of the oxide to be reduced. The process is encouraged by the action of the carbon black in preventing formation of clots; the carbon black is intimately mixed with the oxide. The mixture resulting from the grinding process has a specific surface area of approximately 10 $m^2/g$.

The mixture is homogenised with 33% by weight of furfuryl resin LP 340 from Qo Chemicals in a mill with Z shaped mixing arms. The homogeneous paste is extruded through a die with a screw type extruder and small sticks are obtained. The extrusions are brought to 120° C. in a ventilated oven to ensure that they harden through thermosetting of the resin contained in them. The solid extruded sticks are carbonised continuously at from 700° to 900° C. in a rotating oven with nitrogen, as a sweep gas. Their BET specific surface area is 165 $m^2/g$. The carbonised sticks are then converted continuously in a rotating oven at 1220° C. with argon sweeping.

The products obtained have a specific surface area of 152 $m^2/g$, and identification of phases by X-ray diffractometry indicates the presence of:
a majority phase of molybdenum carbide Mo2C.

I claim:

1. A porous solid essentially comprising a skeleton of metallic or metalloid refractory carbide having after removal of residual carbon a BET specific surface area of at least 15 $m^2/g$, and wherein the refractory carbide has bimodal open porosity having modes of distribution of pores essentially comprising a family of pores ranging from about 1 to 100 microns (mesoporosity) and a family of pores smaller than 0.1 micron (nanoporosity) and excellent mechanical properties.

2. The porous solid of claim 1, having amorphous metastable substances at the surface of the solid refractory carbide forming the skeleton, said amorphous metastable substances being $SiO_x C_y$ and oxycarbonitride type facilitating activation of the surface.

3. The porous solid of claim 1, wherein the refractory carbide includes doping agents.

4. The porous solid of claim 1 comprising a carbide catalyst or catalyst carrier for a high temperature chemical or petrochemical reaction or a reaction converting exhaust fumes from motor vehicles.

5. The porous solid of claim 2, wherein the refractory carbide includes doping agents.

6. The porous solid of claim 1 and having a BET specific surface area of at least 30 $m^2/g$.

* * * * *